US012591875B2

(12) United States Patent
McHugh et al.

(10) Patent No.: US 12,591,875 B2
(45) Date of Patent: Mar. 31, 2026

(54) SYSTEMS AND METHODS OF CONTACTLESS CARD AS ONE AUTHENTICATION FACTOR FOR MULTIPLE FACTOR AUTHENTICATION

(71) Applicant: Capital One Services, LLC, McLean, VA (US)

(72) Inventors: Katherine McHugh, Richmond, VA (US); Lesley Newton, Richmond, VA (US); Patrick Zearfoss, Leesburg, VA (US)

(73) Assignee: Capital One Services, LLC, McLean, VA (US)

( * ) Notice: Subject to any disclaimer, the term of this patent is extended or adjusted under 35 U.S.C. 154(b) by 27 days.

(21) Appl. No.: 18/120,236

(22) Filed: Mar. 10, 2023

(65) Prior Publication Data

US 2024/0303630 A1    Sep. 12, 2024

(51) Int. Cl.
*G06Q 20/00* (2012.01)
*G06Q 20/34* (2012.01)
*G06Q 20/40* (2012.01)

(52) U.S. Cl.
CPC ......... *G06Q 20/352* (2013.01); *G06Q 20/401* (2013.01)

(58) Field of Classification Search
CPC .............. G06Q 20/352; G06Q 20/401; G06Q 20/1085; G06Q 20/18; G06Q 20/341;
(Continued)

(56) References Cited

U.S. PATENT DOCUMENTS 4,683,553 A    7/1987 Mollier
4,827,113 A    5/1989 Rikuna
(Continued)

FOREIGN PATENT DOCUMENTS

CA    3010336    7/2017
CN    101192295    6/2008
(Continued)

OTHER PUBLICATIONS

The International Search Report and Written Opinion mailed Jun. 7, 2024, in related PCT Application No. PCT/US2024/019093 (eight (8) pages).
(Continued)

*Primary Examiner* — Dante Ravetti
(74) *Attorney, Agent, or Firm* — KDW Firm PLLC; Andrew D. Kasnevich

(57) ABSTRACT
Systems and methods for authenticating a user using a contactless card as one authentication factor for multiple factor authentication are provided. In an exemplary embodiment, a server receives a first request of authenticating a user using a first authentication factor, authenticates the user using the first authentication factor, and receives a second request of authenticating the user using a contactless card as a second authentication factor. The server receives a cryptogram of the contactless card, validates the cryptogram, decrypts the cryptogram, and extracts a unique customer identifier of the contactless card. The server verifies the unique customer identifier, authenticates the user using the unique customer identifier, and transmits an authentication result of authenticating the user using the contactless card as the second authentication factor.

20 Claims, 7 Drawing Sheets

(58) Field of Classification Search
 CPC ............. G06Q 20/353; G06Q 20/3821; G06Q
 20/386; G06Q 20/4014; G06Q 20/40145;
 G06Q 20/405; G06Q 20/40975; H04L
 2463/082; H04L 63/0428; H04L 63/0853;
 H04W 12/06
 USPC ............................... 705/16, 21; 380/44, 262
 See application file for complete search history.

(56) References Cited

U.S. PATENT DOCUMENTS

| | | | |
|---|---|---|---|
| 4,910,773 | A | 3/1990 | Hazard et al. |
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |
| 5,533,126 | A | 7/1996 | Hazard |
| 5,537,314 | A | 7/1996 | Kanter |
| 5,590,038 | A | 12/1996 | Pitroda |
| 5,592,553 | A | 1/1997 | Guski et al. |
| 5,616,901 | A | 4/1997 | Crandall |
| 5,666,415 | A | 9/1997 | Kaufman |
| 5,764,789 | A | 6/1998 | Pare, Jr. et al. |
| 5,768,373 | A | 6/1998 | Lohstroh et al. |
| 5,778,072 | A | 7/1998 | Samar |
| 5,796,827 | A | 8/1998 | Coppersmith et al. |
| 5,832,090 | A | 11/1998 | Raspotnik |
| 5,883,810 | A | 3/1999 | Franklin et al. |
| 5,901,874 | A | 5/1999 | Deters |
| 5,929,413 | A | 7/1999 | Gardner |
| 5,960,411 | A | 9/1999 | Hartman et al. |
| 6,021,203 | A | 2/2000 | Douceur et al. |
| 6,049,328 | A | 4/2000 | Vanderheiden |
| 6,058,373 | A | 5/2000 | Blinn et al. |
| 6,061,666 | A | 5/2000 | Do et al. |
| 6,105,013 | A | 8/2000 | Curry et al. |
| 6,199,114 | B1 | 3/2001 | White et al. |
| 6,199,762 | B1 | 3/2001 | Hohle |
| 6,216,227 | B1 | 4/2001 | Goldstein et al. |
| 6,227,447 | B1 | 5/2001 | Campisano |
| 6,282,522 | B1 | 8/2001 | Davis et al. |
| 6,324,271 | B1 | 11/2001 | Sawyer et al. |
| 6,342,844 | B1 | 1/2002 | Rozin |
| 6,367,011 | B1 | 4/2002 | Lee et al. |
| 6,402,028 | B1 | 6/2002 | Graham, Jr. et al. |
| 6,438,550 | B1 | 8/2002 | Doyle et al. |
| 6,501,847 | B2 | 12/2002 | Helot et al. |
| 6,572,015 | B1 | 6/2003 | Norton |
| 6,631,197 | B1 | 10/2003 | Taenzer |
| 6,641,050 | B2 | 11/2003 | Kelley et al. |
| 6,655,585 | B2 | 12/2003 | Shinn |
| 6,662,020 | B1 | 12/2003 | Aaro et al. |
| 6,721,706 | B1 | 4/2004 | Strubbe et al. |
| 6,731,778 | B1 | 5/2004 | Oda et al. |
| 6,779,115 | B1 | 8/2004 | Naim |
| 6,792,533 | B2 | 9/2004 | Jablon |
| 6,829,711 | B1 | 12/2004 | Kwok et al. |
| 6,834,271 | B1 | 12/2004 | Hodgson et al. |
| 6,834,795 | B1 | 12/2004 | Rasmussen et al. |
| 6,852,031 | B1 | 2/2005 | Rowe |
| 6,865,547 | B1 | 3/2005 | Brake, Jr. et al. |
| 6,873,260 | B2 | 3/2005 | Lancos et al. |
| 6,877,656 | B1 | 4/2005 | Jaros et al. |
| 6,889,198 | B2 | 5/2005 | Kawan |
| 6,905,411 | B2 | 6/2005 | Nguyen et al. |
| 6,910,627 | B1 | 6/2005 | Simpson-Young et al. |
| 6,971,031 | B2 | 11/2005 | Haala |
| 6,990,588 | B1 | 1/2006 | Yasukura |
| 7,006,986 | B1 | 2/2006 | Sines et al. |
| 7,085,931 | B1 | 8/2006 | Smith et al. |
| 7,127,605 | B1 | 10/2006 | Montgomery et al. |
| 7,128,274 | B2 | 10/2006 | Kelley et al. |
| 7,140,550 | B2 | 11/2006 | Ramachandran |
| 7,152,045 | B2 | 12/2006 | Hoffman |
| 7,165,727 | B2 | 1/2007 | de Jong |
| 7,175,076 | B1 | 2/2007 | Block et al. |
| 7,202,773 | B1 | 4/2007 | Oba et al. |
| 7,206,806 | B2 | 4/2007 | Pineau |
| 7,232,073 | B1 | 6/2007 | de Jong |
| 7,246,752 | B2 | 7/2007 | Brown |
| 7,252,242 | B2 | 8/2007 | Ho |
| 7,254,569 | B2 | 8/2007 | Goodman et al. |
| 7,263,507 | B1 | 8/2007 | Brake, Jr. et al. |
| 7,270,276 | B2 | 9/2007 | Vayssiere |
| 7,278,025 | B2 | 10/2007 | Saito et al. |
| 7,287,692 | B1 | 10/2007 | Patel et al. |
| 7,290,709 | B2 | 11/2007 | Tsai et al. |
| 7,306,143 | B2 | 12/2007 | Bonneau, Jr. et al. |
| 7,319,986 | B2 | 1/2008 | Praisner et al. |
| 7,325,132 | B2 | 1/2008 | Takayama et al. |
| 7,373,515 | B2 | 5/2008 | Owen et al. |
| 7,374,099 | B2 | 5/2008 | de Jong |
| 7,375,616 | B2 | 5/2008 | Rowse et al. |
| 7,380,710 | B2 | 6/2008 | Brown |
| 7,424,977 | B2 | 9/2008 | Smets et al. |
| 7,453,439 | B1 | 11/2008 | Kushler et al. |
| 7,472,829 | B2 | 1/2009 | Brown |
| 7,487,357 | B2 | 2/2009 | Smith et al. |
| 7,527,208 | B2 | 5/2009 | Hammad |
| 7,568,631 | B2 | 8/2009 | Gibbs et al. |
| 7,584,153 | B2 | 9/2009 | Brown et al. |
| 7,597,250 | B2 | 10/2009 | Finn |
| 7,628,322 | B2 | 12/2009 | Holtmanns et al. |
| 7,652,578 | B2 | 1/2010 | Braun et al. |
| 7,689,832 | B2 | 3/2010 | Talmor et al. |
| 7,703,142 | B1 | 4/2010 | Wilson et al. |
| 7,748,609 | B2 | 7/2010 | Sachdeva et al. |
| 7,748,617 | B2 | 7/2010 | Gray |
| 7,748,636 | B2 | 7/2010 | Finn |
| 7,762,457 | B2 | 7/2010 | Bonalle et al. |
| 7,789,302 | B2 | 9/2010 | Tame |
| 7,793,851 | B2 | 9/2010 | Mullen |
| 7,796,013 | B2 | 9/2010 | Murakami et al. |
| 7,801,799 | B1 | 9/2010 | Brake, Jr. et al. |
| 7,801,829 | B2 | 9/2010 | Gray et al. |
| 7,805,755 | B2 | 9/2010 | Brown et al. |
| 7,809,643 | B2 | 10/2010 | Phillips et al. |
| 7,827,115 | B2 | 11/2010 | Weller et al. |
| 7,828,214 | B2 | 11/2010 | Narendra et al. |
| 7,848,746 | B2 | 12/2010 | Juels |
| 7,882,553 | B2 | 2/2011 | Tuliani |
| 7,900,048 | B2 | 3/2011 | Andersson |
| 7,908,216 | B1 | 3/2011 | Davis et al. |
| 7,922,082 | B2 | 4/2011 | Muscato |
| 7,933,589 | B1 | 4/2011 | Mamdani et al. |
| 7,949,559 | B2 | 5/2011 | Freiberg |
| 7,954,716 | B2 | 6/2011 | Narendra et al. |
| 7,954,723 | B2 | 6/2011 | Charrat |
| 7,962,369 | B2 | 6/2011 | Rosenberg |
| 7,993,197 | B2 | 8/2011 | Mamdani et al. |
| 8,005,426 | B2 | 8/2011 | Huomo et al. |
| 8,010,405 | B1 | 8/2011 | Bortolin et al. |
| RE42,762 | E | 9/2011 | Shin |
| 8,041,954 | B2 | 10/2011 | Plesman |
| 8,060,012 | B2 | 11/2011 | Sklovsky et al. |
| 8,074,877 | B2 | 12/2011 | Mullen et al. |
| 8,082,450 | B2 | 12/2011 | Frey et al. |
| 8,095,113 | B2 | 1/2012 | Kean et al. |
| 8,099,332 | B2 | 1/2012 | Lemay et al. |
| 8,103,249 | B2 | 1/2012 | Markison |
| 8,108,687 | B2 | 1/2012 | Ellis et al. |
| 8,127,143 | B2 | 2/2012 | Abdallah et al. |
| 8,135,648 | B2 | 3/2012 | Oram et al. |
| 8,140,010 | B2 | 3/2012 | Symons et al. |
| 8,141,136 | B2 | 3/2012 | Lee et al. |
| 8,150,321 | B2 | 4/2012 | Winter et al. |
| 8,150,767 | B2 | 4/2012 | Wankmueller |
| 8,186,602 | B2 | 5/2012 | Itay et al. |
| 8,196,131 | B1 | 6/2012 | von Behren et al. |
| 8,215,563 | B2 | 7/2012 | Levy et al. |
| 8,224,753 | B2 | 7/2012 | Atef et al. |
| 8,232,879 | B2 | 7/2012 | Davis |
| 8,233,841 | B2 | 7/2012 | Griffin et al. |
| 8,245,292 | B2 | 8/2012 | Buer |
| 8,249,654 | B1 | 8/2012 | Zhu |
| 8,266,451 | B2 | 9/2012 | Leydier et al. |

(56) References Cited

U.S. PATENT DOCUMENTS

| | | | |
|---|---|---|---|
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,870,081 B2 | 10/2014 | Olson |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,893 B2 | 5/2015 | Kirkham |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,199 B2 | 9/2015 | Spodak |
| 9,129,280 B2 | 9/2015 | Bona et al. |
| 9,152,832 B2 | 10/2015 | Royston et al. |
| 9,183,490 B2 | 11/2015 | Moreton |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,275,325 B2 | 3/2016 | Newcombe |
| 9,286,606 B2 | 3/2016 | Diamond |
| 9,306,626 B2 | 4/2016 | Hall et al. |
| 9,306,753 B1 | 4/2016 | Vandervort |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,501,776 B2 | 11/2016 | Martin |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,744 B2 | 7/2017 | Wurmfeld |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,949,065 B1 | 4/2018 | Zarakas |
| 9,953,323 B2 | 4/2018 | Candelore et al. |
| 9,961,194 B1 | 5/2018 | Wiechman et al. |
| 9,965,632 B2 | 5/2018 | Zarakas |
| 9,965,756 B2 | 5/2018 | Davis et al. |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,990,795 B2 | 6/2018 | Wurmfeld |
| 10,007,873 B2 | 6/2018 | Heo |
| 10,013,693 B2 | 7/2018 | Wyatt |
| 10,043,164 B2 | 8/2018 | Dogin et al. |
| 10,075,437 B1 | 9/2018 | Costigan et al. |
| 10,121,130 B2 | 11/2018 | Pinski |
| 10,129,648 B1 | 11/2018 | Hernandez et al. |
| 10,133,979 B1 | 11/2018 | Eidam et al. |
| 10,210,505 B2 | 2/2019 | Zarakas |
| 10,217,105 B1 | 2/2019 | Sangi et al. |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |

(56)                References Cited

U.S. PATENT DOCUMENTS

| | | |
|---|---|---|
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0171898 A1 | 8/2005 | Bishop et al. |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |

(56) References Cited

U.S. PATENT DOCUMENTS

| | | |
|---|---|---|
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0134452 A1 | 5/2015 | Williams |
| 2015/0134513 A1 | 5/2015 | Olson |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0302409 A1 | 10/2015 | Malek |
| 2015/0317295 A1 | 11/2015 | Sherry |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |

(56) References Cited

U.S. PATENT DOCUMENTS

| | | | |
|---|---|---|---|
| 2017/0124568 A1 | 5/2017 | Moghadam | |
| 2017/0140379 A1 | 5/2017 | Deck | |
| 2017/0154328 A1 | 6/2017 | Zarakas et al. | |
| 2017/0154333 A1 | 6/2017 | Gleeson et al. | |
| 2017/0180134 A1 | 6/2017 | King | |
| 2017/0230189 A1 | 8/2017 | Toll et al. | |
| 2017/0237301 A1 | 8/2017 | Elad et al. | |
| 2017/0289127 A1 | 10/2017 | Hendrick | |
| 2017/0295013 A1 | 10/2017 | Claes | |
| 2017/0316696 A1 | 11/2017 | Bartel | |
| 2017/0317834 A1 | 11/2017 | Smith et al. | |
| 2017/0330173 A1 | 11/2017 | Woo et al. | |
| 2017/0374070 A1 | 12/2017 | Shah et al. | |
| 2018/0034507 A1 | 2/2018 | Wobak et al. | |
| 2018/0039986 A1 | 2/2018 | Essebag et al. | |
| 2018/0039987 A1 | 2/2018 | Molino | |
| 2018/0068316 A1 | 3/2018 | Essebag et al. | |
| 2018/0129945 A1 | 5/2018 | Saxena et al. | |
| 2018/0160255 A1 | 6/2018 | Park | |
| 2018/0189783 A1 | 7/2018 | Flurscheim et al. | |
| 2018/0191501 A1 | 7/2018 | Lindemann | |
| 2018/0205712 A1 | 7/2018 | Versteeg et al. | |
| 2018/0240106 A1 | 8/2018 | Garrett et al. | |
| 2018/0254909 A1 | 9/2018 | Hancock | |
| 2018/0268132 A1 | 9/2018 | Buer et al. | |
| 2018/0270214 A1 | 9/2018 | Caterino et al. | |
| 2018/0294959 A1 | 10/2018 | Traynor et al. | |
| 2018/0300716 A1 | 10/2018 | Carlson | |
| 2018/0302396 A1 | 10/2018 | Camenisch et al. | |
| 2018/0315050 A1 | 11/2018 | Hammad | |
| 2018/0316666 A1 | 11/2018 | Koved et al. | |
| 2018/0322486 A1 | 11/2018 | Deliwala et al. | |
| 2018/0359100 A1 | 12/2018 | Gaddam et al. | |
| 2019/0014107 A1 | 1/2019 | George | |
| 2019/0019375 A1 | 1/2019 | Foley | |
| 2019/0036678 A1 | 1/2019 | Ahmed | |
| 2019/0172055 A1 | 6/2019 | Hale | |
| 2019/0238517 A1 | 8/2019 | D'Agostino et al. | |
| 2019/0303945 A1 | 10/2019 | Mitra | |
| 2020/0234295 A1 | 7/2020 | Newman et al. | |
| 2021/0004806 A1 | 1/2021 | Noe | |
| 2021/0042753 A1 | 2/2021 | Wong et al. | |
| 2021/0067316 A1* | 3/2021 | Bellenger | H04L 63/06 |
| 2021/0272098 A1 | 9/2021 | Delsuc | |
| 2021/0304189 A1 | 9/2021 | Gupta | |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0308278 A1* | 9/2023 | Aabye | G06Q 20/40 |
| 2023/0354020 A1 | 11/2023 | Rule | |
| 2023/0359839 A1 | 11/2023 | Lovgren | |
| 2024/0311801 A1* | 9/2024 | Mossler | G06Q 20/3572 |

FOREIGN PATENT DOCUMENTS

| | | | |
|---|---|---|---|
| CN | 103023643 | 4/2013 | |
| CN | 103417202 | 12/2013 | |
| EP | 1 085 424 | 3/2001 | |
| EP | 1 223 565 | 7/2002 | |
| EP | 1 265 186 | 12/2002 | |
| EP | 1 783 919 | 5/2007 | |
| EP | 2 852 070 | 1/2009 | |
| EP | 2 139 196 | 12/2009 | |
| EP | 1 469 419 | 2/2012 | |
| GB | 2 457 221 | 8/2009 | |
| GB | 2 516 861 | 2/2015 | |
| GB | 2 551 907 | 1/2018 | |
| KR | 101508320 | 4/2015 | |
| KR | 20150140132 A | 12/2015 | |
| WO | 9910824 A1 | 3/1999 | |
| WO | WO 00/49586 | 8/2000 | |
| WO | WO 2006070189 | 7/2006 | |
| WO | WO 2008055170 | 5/2008 | |
| WO | WO 2009025605 | 2/2009 | |
| WO | WO 2010049252 | 5/2010 | |
| WO | WO 2011112158 | 9/2011 | |
| WO | WO 2012001624 | 1/2012 | |
| WO | WO 2013039395 | 3/2013 | |
| WO | WO 2013155562 | 10/2013 | |
| WO | WO 2013192358 | 12/2013 | |
| WO | WO 2014043278 | 3/2014 | |
| WO | WO 2014170741 | 10/2014 | |
| WO | WO 2015179649 | 11/2015 | |
| WO | WO 2015183818 | 12/2015 | |
| WO | WO 2016097718 | 6/2016 | |
| WO | WO 2016160816 | 10/2016 | |
| WO | WO 2016168394 | 10/2016 | |
| WO | 2017047855 A1 | 3/2017 | |
| WO | WO 2017042375 | 3/2017 | |
| WO | WO 2017042400 | 3/2017 | |
| WO | WO 2017157859 | 9/2017 | |
| WO | WO 2017208063 | 12/2017 | |
| WO | WO 2018063809 | 4/2018 | |
| WO | WO 2018137888 | 8/2018 | |
| WO | 2019022585 A1 | 1/2019 | |
| WO | 2021051884 A1 | 3/2021 | |
| WO | 2021133492 A1 | 7/2021 | |
| WO | 2022108959 A1 | 5/2022 | |
| WO | 2022187350 A1 | 9/2022 | |
| WO | 2023017943 A1 | 2/2023 | |
| WO | 2023064063 A1 | 4/2023 | |

OTHER PUBLICATIONS

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

(56)          References Cited

OTHER PUBLICATIONS

Author unknown, "NFC Guide: All You Need to Know About Near Field Communication" Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug Big Seven open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.1, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_ encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE Africon at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera Slam", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, heeps://web.archive.org/, 75 pages.

Author Unknown, "Global expansion of card tapping mobile OTP for security and convenience is imminent," Jun. 28, 2022, website: https://www.swidch.com/blogs/card-tapping-motp-blog.

Emyco, "EMV Card Personalisation Specification," Aug. 1, 2021, pp. 1-114, Retrieved from the Internet URL: https://www.emvco.com/specification/?post_id=12467.

Saush, "Getting information from an EMV chip card with Java," Sep. 8, 2006, WordPress, pp. 1-13.

Smart Card Alliance, "Co-Branded Multi-Application Contactless Cards for Transit and Financial Payment," A Smart Card Alliance Transportation Council White Paper (40 pages), Mar. 2008.

* cited by examiner

200

300

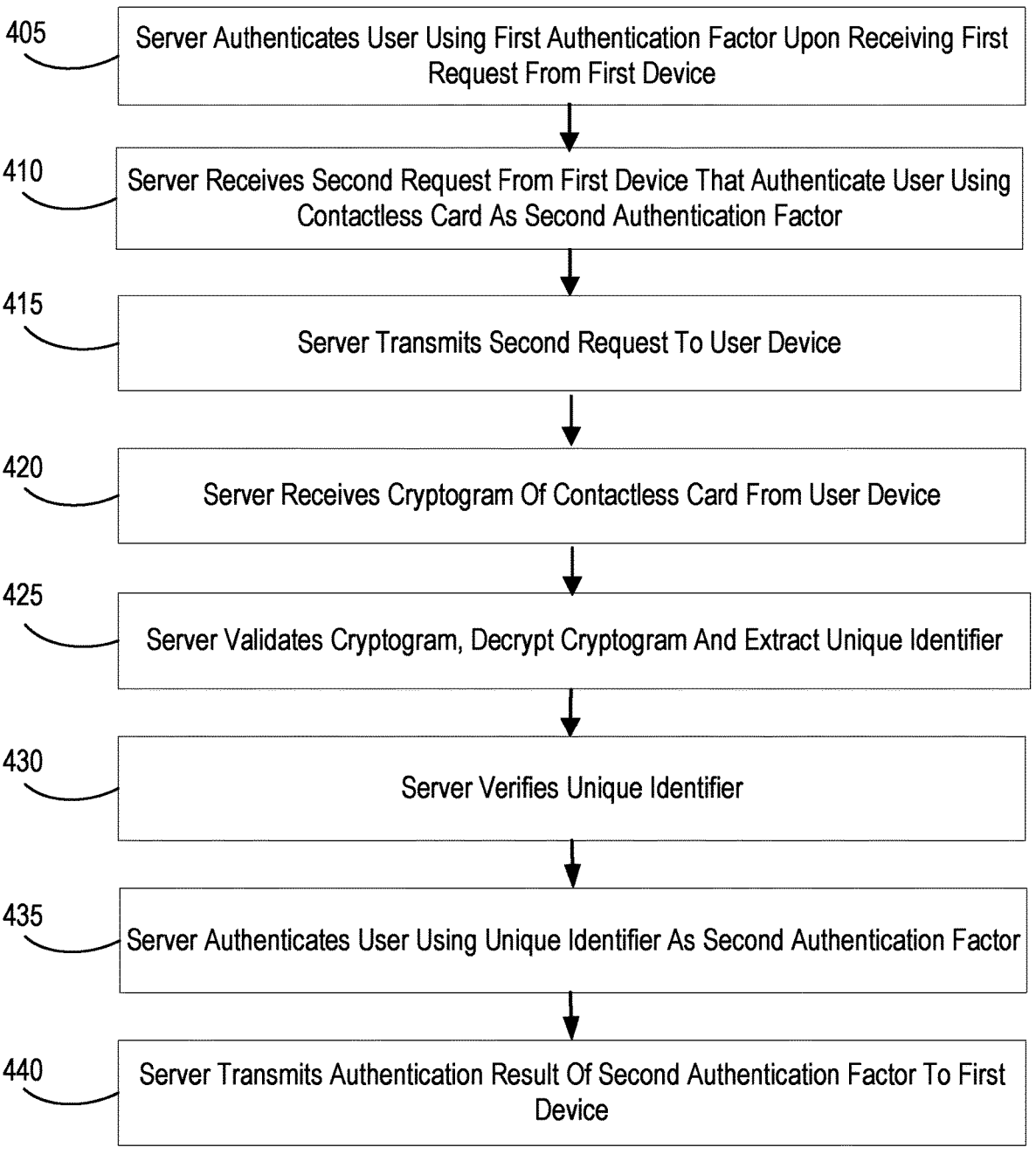

405    Server Authenticates User Using First Authentication Factor Upon Receiving First Request From First Device 410    Server Receives Second Request From First Device That Authenticate User Using Contactless Card As Second Authentication Factor 415    Server Transmits Second Request To User Device 420    Server Receives Cryptogram Of Contactless Card From User Device 425    Server Validates Cryptogram, Decrypt Cryptogram And Extract Unique Identifier 430    Server Verifies Unique Identifier 435    Server Authenticates User Using Unique Identifier As Second Authentication Factor 440    Server Transmits Authentication Result Of Second Authentication Factor To First Device

First Device Receives Engagement Initiated By User Device

510

First Device Requests Server To Authenticate User Using First Authentication Factor

515

First Device Requests Server To Authenticate User Using Contactless Card As Second Authentication Factor

520

First Device Receives From Server Authentication Result Of Second Authentication Factor

500

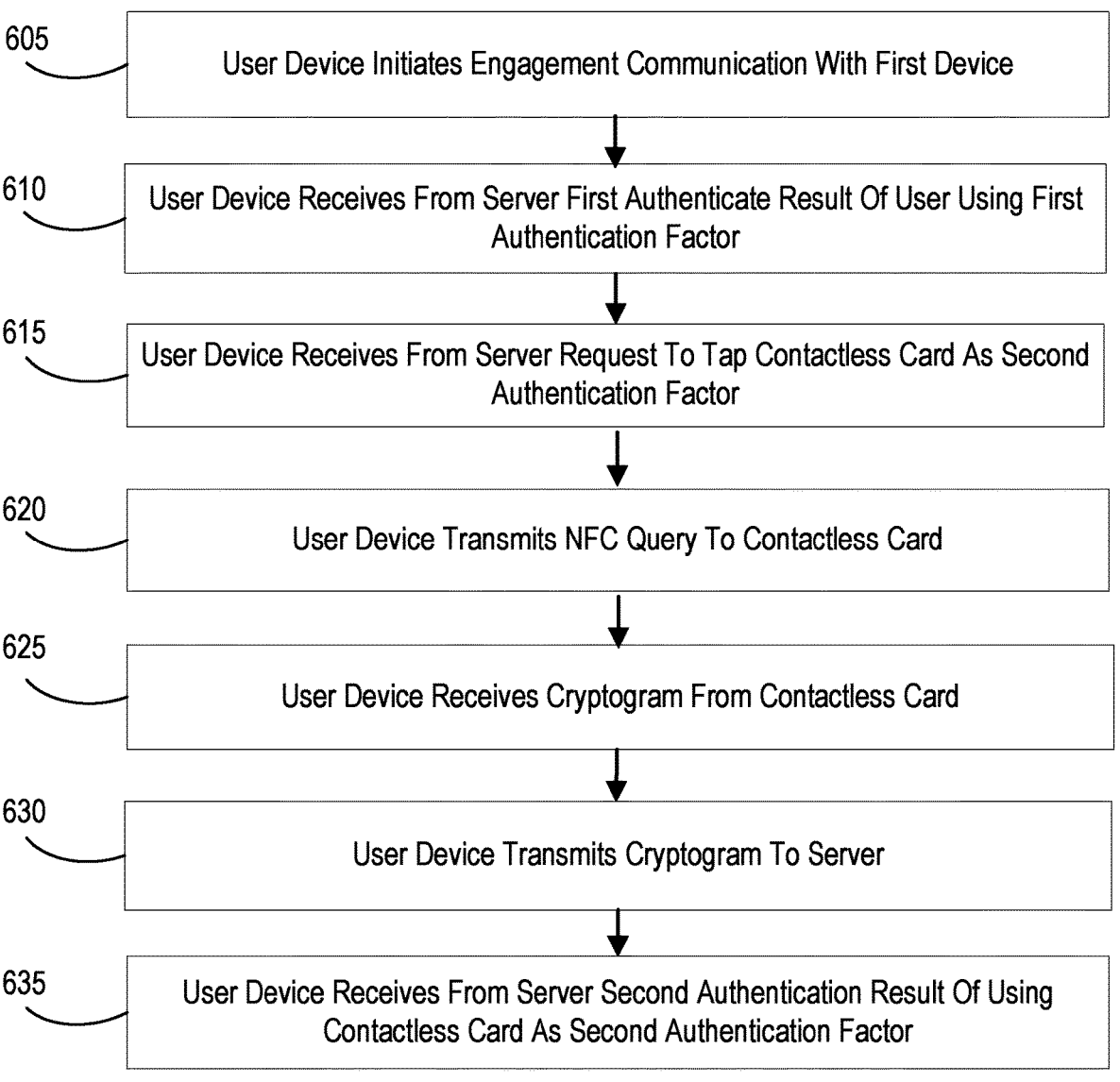

605   User Device Initiates Engagement Communication With First Device

610   User Device Receives From Server First Authenticate Result Of User Using First Authentication Factor 615   User Device Receives From Server Request To Tap Contactless Card As Second Authentication Factor 620   User Device Transmits NFC Query To Contactless Card 625   User Device Receives Cryptogram From Contactless Card 630   User Device Transmits Cryptogram To Server 635   User Device Receives From Server Second Authentication Result Of Using Contactless Card As Second Authentication Factor

SYSTEMS AND METHODS OF CONTACTLESS CARD AS ONE AUTHENTICATION FACTOR FOR MULTIPLE FACTOR AUTHENTICATION

FIELD OF THE INVENTION

The present disclosure relates generally to data security, and more particularly, to systems and methods for authenticating a user using a contactless card as one authentication factor for multiple factor authentication.

BACKGROUND

Data security and transaction integrity are of critical importance to businesses and consumers. Customers are usually authenticated using multiple factors when transactions are being conducted. Email may be used as one authentication factor to verify customers and/or transactions, but email is susceptible to attack and vulnerable to hacking or other unauthorized access. Short message service (SMS) messages may also be used, but that is subject to compromise as well.

When customers conduct high risk transactions, such as activating financial cards (e.g., credit cards and other payment cards), revealing digital financial cards, and so forth, multiple factor authentication including one secure factor is highly desired. Although a photo identification (ID) (e.g., a government-issued ID) can be presented as a second authentication factor, it does not work or is inconvenient for online transactions or other transaction that are not conducted face-to-face.

These and other deficiencies exist. Accordingly, there is a need to provide systems and methods that overcome these deficiencies to authenticate a user using a more secure factor, such as a contactless card, as one authentication factor for multiple factor authentication.

SUMMARY

Aspects of the disclosed technology include systems and methods of authenticating a user using a contactless card as one authentication factor for multiple factor authentication.

Embodiments of the present disclosure provide a method for authenticating a user using a contactless card as a second authentication factor. The method comprises: receiving, by a server from a first device, a first request of authenticating the user using a first authentication factor; authenticating, by the server, the user using the first authentication factor; transmitting, by the sever to the first device, a first authentication result of authenticating the user using the first authentication factor; receiving, by the server from the first device, a second request of authenticating the user using the contactless card as the second authentication factor; transmitting, by the server to a user device associated with the user, the second request in a message format; receiving, by the server from the user device, a cryptogram of the contactless card; validating, by the server, the cryptogram; decrypting, by the server, the cryptogram; extracting, by the server, from the decrypted cryptogram a unique customer identifier of the contactless card; verifying, by the server, the unique customer identifier; authenticating, by the server, the user using the unique customer identifier; and transmitting, by the sever to the first device, a second authentication result of authenticating the user using the contactless card as the second authentication factor.

Embodiments of the present disclosure provide a system for authenticating a user using a contactless card as a second authentication factor. The system comprises a server, and the server is configured to: receive, from a first device, a first request of authenticating the user using a first authentication factor; authenticate the user using the first authentication factor; transmit, to the first device, a first authentication result of authenticating the user using the first authentication factor; receive, from the first device, a second request of authenticating the user using the contactless card as the second authentication factor; transmit, to a user device associated with the user, the second request in a message format; receive, from the user device, a cryptogram of the contactless card; validate the cryptogram; decrypt the cryptogram; extract from the decrypted cryptogram a unique customer identifier of the contactless card; verify the unique customer identifier; authenticate the user using the unique customer identifier; and transmit, to the first device, a second authentication result of authenticating the user using the contactless card as the second authentication factor.

Embodiments of the present disclosure provide a non-transitory, computer-readable medium comprising instructions for authenticating a user using a contactless card as a second authentication factor that, when executed on a computer arrangement, perform actions comprising: receiving, from a first device, a first request of authenticating the user using a first authentication factor; authenticating the user using the first authentication factor; transmitting, to the first device, a first authentication result of authenticating the user using the first authentication factor; receiving, from the first device, a second request of authenticating the user using the contactless card as the second authentication factor; transmitting, to a user device associated with the user, the second request in a message format; receiving, from the user device, a cryptogram of the contactless card; validating the cryptogram; decrypting the cryptogram; extracting from the decrypted cryptogram a unique customer identifier of the contactless card; verifying the unique customer identifier; authenticating the user using the unique customer identifier; and transmitting, to the first device, a second authentication result of authenticating the user using the contactless card as the second authentication factor. Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

FIG. 4 is a flow chart of a method for authenticating a user using a contactless card as a second authentication factor according to an example embodiment.

3

Figure 1:
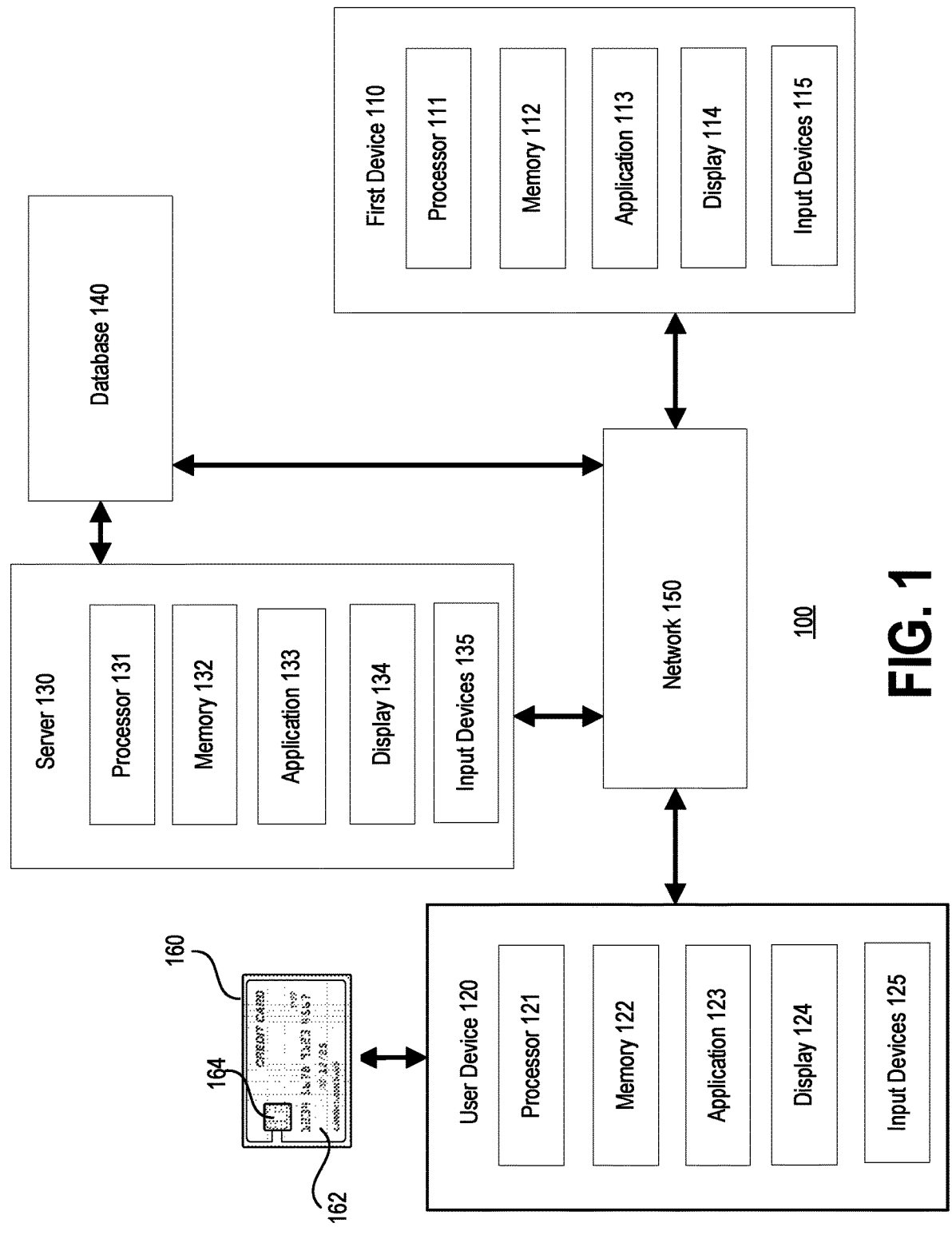
FIG. 1 is a diagram of a system for authenticating a user using a contactless card as a second authentication factor according to an example embodiment.

FIG. 6 is a flow chart of a method for authenticating a user using a contactless card as a second authentication factor according to an example embodiment.

DETAILED DESCRIPTION OF EXAMPLE EMBODIMENTS

The following description of embodiments provides non-limiting representative examples referencing numerals to particularly describe features and teachings of different aspects of the invention. The embodiments described will be recognized as capable of implementation separately, or in combination, with other embodiments from the description of the embodiments and the features and teachings of any embodiment can be interchangeably combined with the features and teachings of any other embodiment. A person of ordinary skill in the art reviewing the description of embodiments will be able to learn and understand the different described aspects of the invention. The description of embodiments should facilitate understanding of the invention to such an extent that other implementations, not specifically covered but within the knowledge of a person of skill in the art having read the description of embodiments, will be understood to be consistent with an application of the invention.

The described features and teachings of the embodiments may be combined in any suitable manner. A person of ordinary skill in the art will recognize that the embodiments may be practiced without one or more of the specific features and teachings of an embodiment. In other instances, additional features and teachings may be recognized in certain embodiments that may not be present in all embodiments. A person of ordinary skill in the art will understand that the described features and teachings of any embodiment can be interchangeably combined with the features and teachings of any other embodiment.

Example embodiments of the present disclosure provide systems and methods for authenticate a user using a contactless card as one authentication factor for multiple factor authentication. The present invention allows a user to use something he or she has with a contactless card to complete a high risk authentication transaction via a channel and/or space that does not allow for near field communication (NFC) usage. As such, the user can log in his/her account (something he or she knows) in a different channel while having a NFC-enabled device (such as a mobile phone) that can read the contactless card as a second authentication factor for the multiple factor authentication.

An improved customer experience may include allowing a contactless card to be used in either with or without another login (e.g., login into a banking application for reading the contactless card) to ease on a device, such as an Android® instant application, a post auth session on an iOS® application, a push notification with a long press, and tapping the contactless card in a drop down action as part of same experience. The NFC session may launch within the banking application context itself, or may be launched directly in response to the notification received on the device.

In the present disclosure, a contactless card can be used as an authentication method that can be instantiated as an out of band or second factor authentication in scenario where a user could be doing the primary action (e.g., a high risk transaction like a digital card reveal) on web, tablet, non-NFC based device, call center, interactive voice response (IVR), Capital One® ENO® virtual assistant, a bank branch, or any other channels used for customer servicing. The interaction with the contactless card can be initiated on a NFC-enabled mobile device using communications such as SMS with deeplink, mobile application notifications, push notification, email, or any other channel that can be received on a user device.

FIG. 1 illustrates a system 100 for authenticating a user using a contactless card as a second authentication factor for multiple factor authentication according to an example embodiment. As further discussed below, the system 100 may include a first device 110, a user device 120, a server 130, a database 140 in communication using a network 150, and a contactless card 160 in signal communication with the user device 120. Although FIG. 1 illustrates single instances of the components, the system 100 may include any number of components.

The first device 110 may be associated with a merchant with which the transactions are conducted by the user through the user device 120, for example, online purchases made from the merchant. The first device 110 may also be associated with a call and/or service center to which the user may make a call to initiate a transaction such as discussing product and/or service issues. The first device 110 may further be associated with a bank branch in which the user may conduct an transaction and interact with a bank employee. If the first device 110 is associated with a merchant, the first device 110 can be configured to store the online merchant accounts, and to present a shopping interface on which the user can conduct the transactions with the merchant.

The first device 110 may be a network-enabled computer device. Exemplary network-enabled computer devices include, without limitation, a contactless card, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The first device 110 may include a processor 111, a memory 112, and an application 113. The processor 111 may be a processor, a microprocessor, or other processor, and the first device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the first device 110 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 112 may be configured to store one or more software applications, such as the application 113, and other data, such as user's shopping and financial account information.

The application 113 may comprise one or more software applications comprising instructions for execution on the first device 110. In some examples, the first device 110 may execute one or more applications, such as software applications, that enable, for example, network communications with one or more components of the system 100, transmit and/or receive data, and perform the functions described herein. Upon execution by the processor 111, the application 113 may provide the functions described in this specification, specifically to execute and perform the steps and functions in the process flows described below. For example, the application 113 may be executed to perform authenticating the user or send an authentication request of authenticating the user to the server 130. The application 113 may also be executed to perform processing transactions of a user who may shop online from the merchant. Such processes may be implemented in software, such as software modules, for execution by computers or other machines. The application 113 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The first device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the first device 110 that is available and supported by the first device 110, such as a touch-screen, keyboard, mouse, cursor-control device, touch-screen, microphone, digital camera, video recorder or camcorder. These devices may be used to enter information and interact with the software and other devices described herein.

The user device 120 can be used by a user to initiate and/or perform transactions with the first device 110, for example, a call to a customer service center associated with the first device 110. The user device 120 may be configured to present to the user a user interface from which the user may log into, for example, their bank or credit card account to access their transaction statement and/or financial information stored in the database 140 of the server 130. The user interface may also be configured to perform data communication with the contactless card 160. The user device 120 may be configured to display on the user interface a merchant's website, in response to a selection by the user of accessing the merchant's website.

The user device 120 may be a network-enabled computer device. Exemplary network-enabled computer devices include, without limitation, a contactless card, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 120 may include a processor 121, a memory 122, an application 123, a display 124, and input devices 125. The processor 121 may be a processor, a microprocessor, or other processor, and the user device 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the user device 120 may include one or more of these memories. A read-only memory may be factory programmable as read-only or one-time programmable. One-time programmability provides the opportunity to write once then read many times. A write-once readmultiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as private and personal information.

The application 123 may comprise one or more software applications comprising instructions for execution on the user device 120. In some examples, the user device 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. Such processes may be implemented in software, such as software modules, for execution by computers or other machines. The application 123 may provide graphic user interfaces (GUIs) through which users may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the user device 120 that is available and supported by the user device 120, such as a touch-screen, keyboard, mouse, cursor-control device, touch-screen, microphone, digital camera, video recorder or camcorder. These devices may be used to enter information and interact with the software and other devices described herein such as selecting an option of creating an online account with the merchant.

The server 130 may be associated with an institution, such as a financial institution, and can be configured to communicate with the first device 110 and the user device 120. The institution associated with the server 130 may issue the contactless card 160 to the user and accordingly may authenticate the user based on the contactless card 160.

The server 130 may be a network-enabled computer device. Exemplary network-enabled computer devices include, without limitation, a contactless card, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 130 may include a processor 131, a memory 132, and an application 133. The processor 131 may be a processor, a microprocessor, or other processor, and the server 130 may include one or more of these processors. The processor 131 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 131 may be coupled to the memory 132. The memory 132 may be a read-only memory, write-once read-multiple memory or read/write memory, e.g., RAM, ROM, and EEPROM, and the server 130 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 132 may be configured to store one or more software applications, such as the application 133, and other data, such as user's financial account information and the contactless card information.

The application 133 may comprise one or more software applications, such as a card authentication module, comprising instructions for execution on the server 130. In some examples, the server 130 may execute one or more applications, such as software applications, that enable, for example, network communications with one or more components of the system 100, transmit and/or receive data, and perform the functions described herein. Upon execution by the processor 131, the application 133 may provide the functions described in this specification, specifically to execute and perform the steps and functions in the process flows described below. For example, the card authentication module of the application 133 may be executed to perform authenticating the user based on the contactless card 160. Such processes may be implemented in software, such as software modules, for execution by computers or other machines. The application 133 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 130 may further include a display 134 and input devices 135. The display 134 may be any type of device for presenting visual information such as a computer monitor, a flat panel display, and a mobile device screen, including liquid crystal displays, light-emitting diode displays, plasma panels, and cathode ray tube displays. The input devices 135 may include any device for entering information into the server 130 that is available and supported by the server 130, such as a touch-screen, keyboard, mouse, cursor-control device, touch-screen, microphone, digital camera, video recorder or camcorder. These devices may be used to enter information and interact with the software and other devices described herein.

The database 140 may be one or more databases configured to store date, including without limitation, private information of users, financial accounts of users, contactless card information, online merchant account information, transactions of users, and merchant records indicative of corresponding merchants. The database 140 may comprise a relational database, a non-relational database, or other database implementations, and any combination thereof, including a plurality of relational databases and non-relational databases. In some examples, the database 140 may comprise a desktop database, a mobile database, or an in-memory database. Further, the database 140 may be hosted internally by the server 130 or may be hosted externally of the server 130, such as by a server, by a cloud-based platform, or in any storage device that is in data communication with the server 130.

The system 100 may include one or more networks 150. In some examples, the network 150 may be one or more of a wireless network, a wired network or any combination of wireless network and wired network, and may be configured to connect the first device 110, the user device 120, the server 130, and the database 140. For example, the network 150 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 150 may include, without limitation, telephone lines, fiber optics, IEEE Ethernet 902.3, a wide area network, a wireless personal area network, a LAN, or a global network such as the Internet. In addition, the network 150 may support an Internet network, a wireless communication network, a cellular network, or the like, or any combination thereof. The network 150 may further include one network, or any number of the exemplary types of networks mentioned above, operating as a stand-alone network or in cooperation with each other. The network 150 may utilize one or more protocols of one or more network elements to which they are communicatively coupled. The network 150 may translate to or from other protocols to one or more protocols of network devices. Although the network 150 is depicted as a single network, it should be appreciated that according to one or more examples, the network 150 may comprise a plurality of interconnected networks, such as, for example, the Internet, a service provider's network, a cable television network, corporate networks, such as credit card association networks, and home networks. The network 150 may further comprise, or be configured to create, one or more front channels, which may be publicly accessible and through which communications may be observable, and one or more secured back channels, which may not be publicly accessible and through which communications may not be observable.

In some examples, communications between the first device 110, server 130, and user device 120 using the network 150 can occur using one or more front channels and one or more secure back channels. A front channel may be a communication protocol that employs a publicly accessible and/or unsecured communication channel such that a communication sent to the first device 110, server 130, and/or user device 120 may originate from any other device, whether known or unknown to the first device 110, server 130, and/or user device 120, if that device possesses the address (e.g., network address, Internet Protocol (IP) address) of the first device 110, server 130, and/or user device 120. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the first device 110, server 130, and/or user device 120 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

The contactless card 160 may be any type of card, such as a security card, a payment card, an identification card, and the like. The contactless card 160 may be issued to the user by the financial institution for identity verification for the bank account of the user The contactless card 160 can be configured to transmit a cryptogram to the user device 120 upon tapping to the user device 120. The user device 120 may be configured to read the cryptogram from the contactless card 160 after entry of the contactless card 160 into a communication field of the user device 120. The user device 120 may then transmit the cryptogram to the server 130. The server 130 may be configured to verify the cryptogram by searching the database 140.

The contactless card 160 can perform authentication and numerous other functions that may otherwise require a user to carry a separate physical token in addition to the contactless card 160. By employing a contactless interface, the contactless card 160 may be provided with a method to interact and communicate between a user's device (such as a mobile phone or the user device 120) and the card itself. For example, the Europay, Mastercard, and Visa (EMV) protocol, which underlies many credit card transactions, includes an authentication process which suffices for operating systems for Android® but presents challenges for iOS®, which is more restrictive regarding near field communication (NFC) usage, as it can be used only in a read-only manner. Exemplary embodiments of the contactless card 160 described herein utilize NFC technology. The contactless card 160 may comprise a substrate 162 and a contact pad 164. Details of an example contactless card will be described in FIGS. 3A and 3B.

Figure 2:
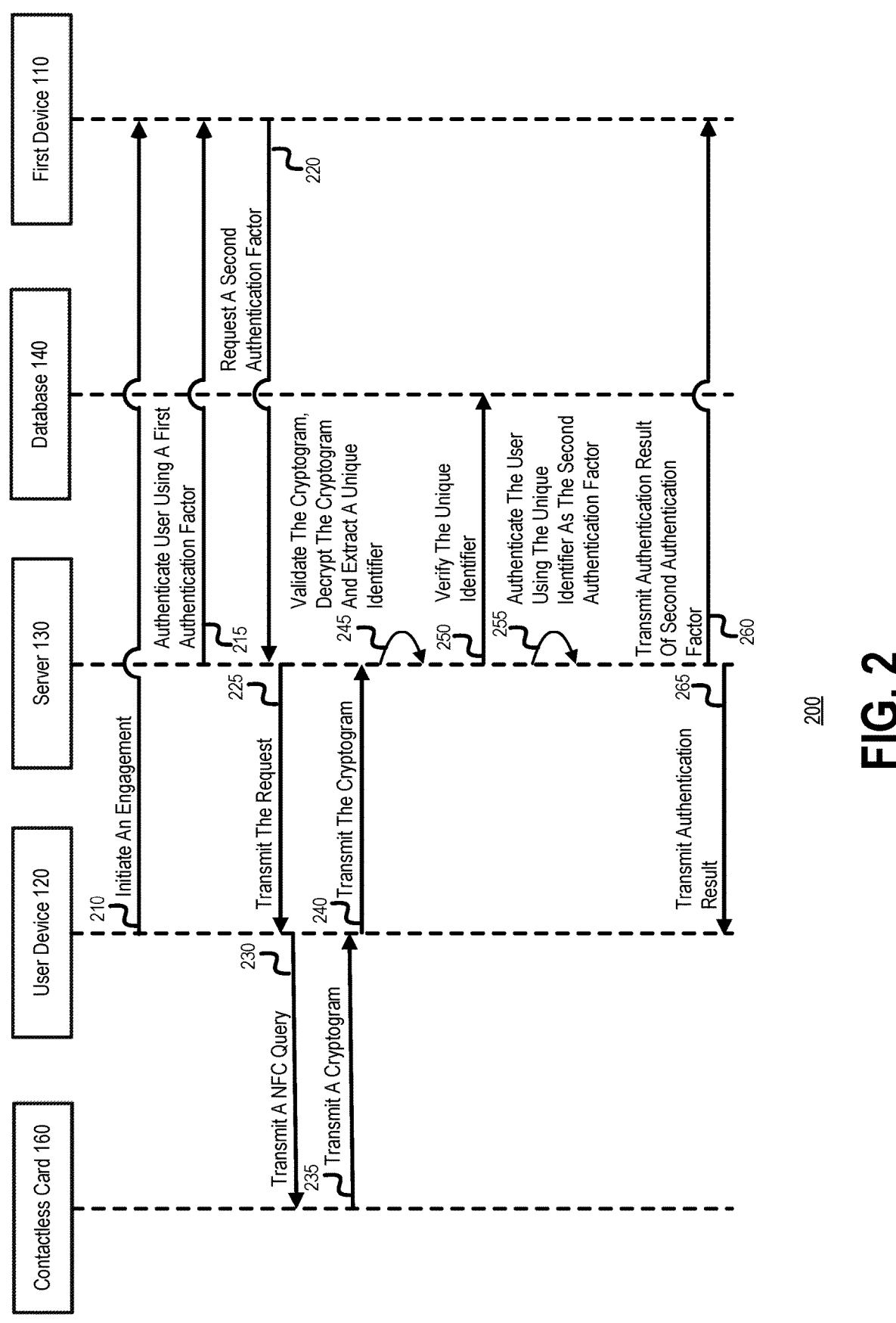
FIG. 2 is a diagram of sequential interactions between components of the system in FIG. 1 according to an example embodiment.

FIG. 2 illustrates an example diagram 200 of sequence interaction between the components of the system 100 according to an example embodiment. FIG. 2 may reference the same or similar components as those illustrated in FIG. 1, including a user device, a server, a database, a first device and a contactless card.

When a user wants to make an online purchase from a merchant, the user may use the user device 120 to log into his/her online account with the merchant is associated with the first device 110. Alternatively, the user may call using the user device 120 to a customer service center that is associated with the first device 110. In those example embodiments, the user using the user device 120 initiates an engagement with the first device 110 at step 210.

Upon receiving the login credentials or the phone call from the user device 120, the first device 110 may transmit a first authentication request to the server 130 for authenticating the user. Accordingly, the server 130 may authenticate the user using a first authentication factor at step 215. The first authentication factor may the login credential or the phone number associated with the user device 120. For example, the first device 110 may forward the login credential or the phone number to the server 130, and the server 130 may then search for and verify the login credential or the phone number in the database 140.

To further authenticate the user or perform a multiple factor authentication of the user, the first device 110 may request a second authentication factor for authenticating the user and transmit the request to the server 130 at step 220. For example, the second authentication factor may be a contactless card, such as the contactless card 160.

At step 225, the server 130 may transmit the request of using the contactless card 160 as the second authentication factor to the user device 120. The request may be a short message service (SMS) message with a link that would open up a mobile app or mobile app process on the user device 120 from which the contactless card 160 can be read in that mobile app.

Upon receiving the request and by clicking on the link included in the request, the user may use the user device 120 to transmit an NFC prompt and/or query to the contactless card 160 at step 230. The user device 120 may include an NFC interface configured for establishing an NFC communication with other NFC-equipped devices (the contactless card 160 in this embodiment). In some of these embodiments, the NFC interface of the user device 120 may be or include an NFC receiver configured for selectively activating a magnetic field for use in establishing near field communication with an NFC transmitter. The NFC interface of the user device 120 is configured for establishing NFC communication when a passive NFC tag or other NFC-enabled device is brought into the magnetic field and within the NFC communication range of the user device 120. The NFC interface of the user device 120 is configured, in particular, for communication with the NFC-enabled card 160 when the card 160 is brought within communication range of the user device 120 (such as, the contactless card 160 is tapped by the user to the user device 120). As used herein, a tap of the contactless card 160 to the user device 120 may not indicate that the contactless card 160 is in a physical contact with the user device 120. A tap of the contactless card 160 to the user device 120 may refer to entry of the contactless card 160 into the NFC communication field of the user device 120.

In response, after entry of the contactless card 160 into the NFC communication field of the user device 120, the contactless card 160 transmits, at step 235 to the user device 120 NFC response information (e.g., a cryptogram) usable by the server 130 to authenticate the user. The NFC response information may be or include, for example, security information encrypted by the contactless card 160 using a private key unique to the card that is known only to the card account administrator (the server 130). The cryptogram may be stored in the memory of the contactless card 160. The cryptogram includes the unique identifier of the contactless card 160.

At step 240, the user device 120 transmits the NFC response information (the cryptogram) the server 130. At step 245, the server 130 receives the cryptogram from the user device 120. The server 130 validates the cryptogram, decrypts the cryptogram and extracts the unique identifier of the contactless card 160 through the card authentication module of the server 130. When the server receives the cryptogram, the server may decrypt the cryptogram after verifying the cryptogram. The server 130 may then extract the unique identifier of the contactless card 160 which is uniquely associated with the user. At step 250, the server 130 may verify the unique identifier of the contactless card 160 by searching the database 140. Then at step 255, the server 130 may authenticate the user based on the unique identifier of the contactless card 160. That is, the server 130 may authenticate the user using the contactless card 160 as the second authentication factor based on the unique identifier of the contactless card 160.

In some embodiments, the server 130 may also require the user to enter a personal identification code/number (PIN) as a third authentication factor. Alternatively, the server 130 may require the user to enter a one-time passcode (OTP) as a third authentication factor that is randomly generated and transmitted by the server 130 to the user device 120 in a text message. At step 255, the server 130 may transmit to the first device 110 the authentication result of using the contactless card 160 as the second authentication factor. Also the server 130 may transmit to the user device 120 the authentication result of using the contactless card 160 as the second authentication factor. Once the user is authenticated using the contactless card 160 as the second authentication factor, the user can continue the initiated transaction with the first device 110 through the user device 120.

As described above, when a user uses a user device to initiate an event or transaction with another device, the user can be directed to use a mobile app installed on the user device to read a contactless card for authenticating the user as a second factor for multiple factor authentication. For example, the user may make a call to a call center because the user is having a problem with his/her account, to verify the user, an SMS with a link that would open up a mobile app or mobile app process can be transmitted to the user through the user device and the user would be able to read the contactless card in that mobile app and then that contactless card data would go back to the call center agent and/or server, so the call center would be able to verify the user is using his/her contactless card to do this extra verification step. As another example, the user may be just logging in on a website, and the channel (e.g., the website) then switches the user to the mobile app on the user device to do this extra verification step. As a further example, the user may visit a local bank branch which can trigger a similar process, where the user can be switched over to his/her mobile phone for the contactless card tap as a second authentication factor of identity confirmation.

The first factor may include username and password, and a biometric login (such as a touch ID (e.g., a fingerprint ID), face ID, retina ID, voice ID). In the present disclosure, the first factor may also include a phone number of the user, a check or saving account number of the user, a photo ID of the user (such as driver's license of the user). For example, when the user call the call center, the phone number of the user can be recognized as the first factor for authenticating the user. When the user is in a bank branch and a teller or a bank associate is pulling up details of the user, the driver's license of the user may be used as the first factor for authenticating the user. When a second authentication factor is needed, the teller or the bank associate may just watch the user to tap the contactless card to the user device 120 of the user as the second factor. Alternatively, a link with a deep links may be transmitted into the mobile app of the user device 120, and the user can follow the link to tap the contactless card. In such scenarios, the user does not have to fully log in the mobile app installed on the user device 120. The user just taps the contactless card to the user device 120 and the server 130 is going back to inform that call center agent or that teller in the bank branch.

Figure 3A:
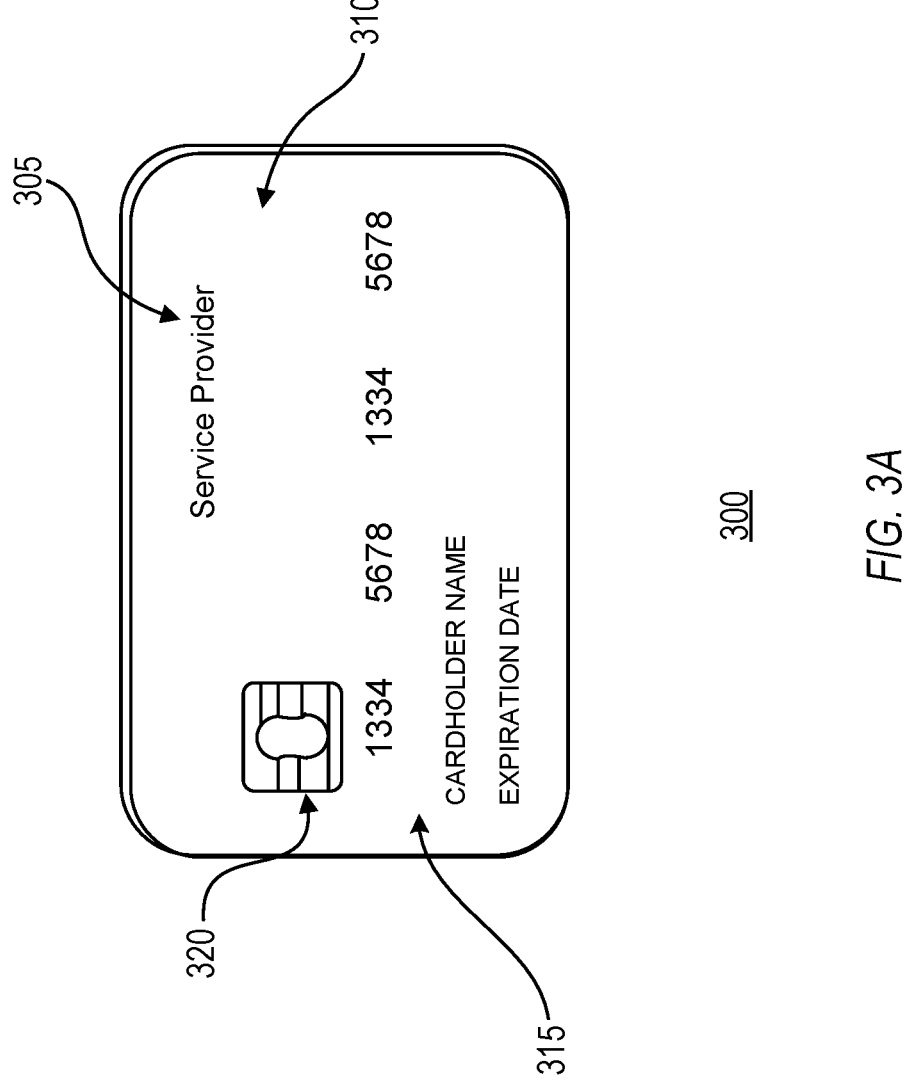
FIG. 3A is a contactless card used for authenticating a user as a second authentication factor according to an example embodiment.

FIG. 3A describes a contactless card 300 that can be used for authenticating the user as a second authentication factor in the system 100 of FIG. 1. For example, the contactless card 160 in FIG. 1 can be the contactless card 300 described herein. The contactless card 300 is configured to communicate with the user device 120 of system 100. The contactless card 300 may comprise a payment card, such as a credit card, debit card, or gift card, issued by a service provider 305 (such as a bank associated with the server 130) displayed on the front or back of the contactless card 300. In some examples, the contactless card 300 is not related to a payment card, and may comprise, without limitation, an identification card, a membership card, and a transportation card. In some examples, the contactless card 300 may comprise a dual interface contactless payment card.

The contactless card 300 may comprise a substrate 310, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card 300 may otherwise be compliant with the ISO/IEC 14443 standard. However, it is understood that the contactless card 300 according to the present disclosure may have different characteristics, and the present disclosure does not require the contactless card 300 to be implemented in a payment card.

The contactless card 300 may also include identification information 315 displayed on the front and/or back of the contactless card 300, and a contact pad 320. The contact pad 320 may be configured to establish contact with another communication device, such as a user device, smart phone, laptop, desktop, or tablet computer. The contactless card 300 may also include processing circuitry, antenna and other components. These components may be located behind the contact pad 320 or elsewhere on the substrate. The contactless card 300 may also include a magnetic strip or tape, which may be located on the back of the contactless card 300.

Figure 3B:
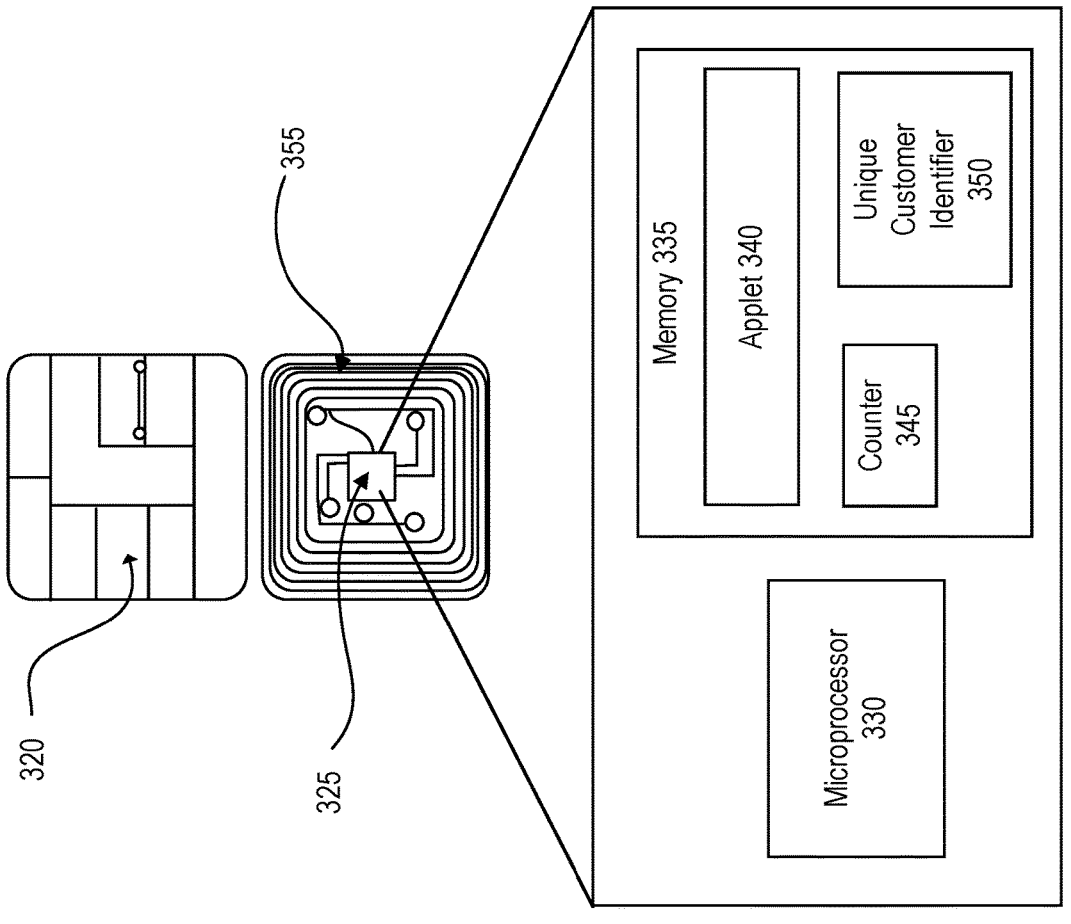
FIG. 3B is a diagram of the processor of the contactless card in FIG. 3A according to an example embodiment.

FIG. 3B illustrates an example contact pad 320 of the contactless card 300. The contact pad 320 of the contactless card 300 may include processing circuitry 325 for storing and processing information, including a processor 330 and a memory 335. It is understood that the processing circuitry 325 may contain additional components, including processors, memories, error and parity/CRC checkers, data encoders, anticollision algorithms, controllers, command decoders, security primitives and tamperproofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

In some embodiments, the memory 335 may also have stored public and private card encryption keys. In some embodiments, the private and public encryption keys may be permanently hard-wired into the memory 335. In various embodiments, the memory 335 may have stored therein instructions for generating encrypted information and transmitting it to a receiving device (e.g., the user device 120). Such encrypted information may be or include an encrypted verification block or signature that may be used to authenticate and verify the presence of the card 300 during transaction processing. In some embodiments, encrypted information may be unique to a particular communication (e.g., a particular NFC transmission by the card 300).

The memory 335 may be configured to store one or more applets 340, one or more counters 345, and a unique customer identifier 350. The one or more applets 340 may comprise one or more software applications configured to execute on one or more contactless cards, such as Java Card applet. However, it is understood that the one or more applets 340 are not limited to Java Card applets, and instead may be any software application operable on contactless cards or other devices having limited memory. The one or more counters 345 may comprise a numeric counter sufficient to store an integer. The unique customer identifier 350 may comprise a unique alphanumeric identifier assigned to a user of the contactless card 300, and the identifier may distinguish the user of the contactless card 300 from other contactless card users. In some examples, the customer identifier 350 may identify both a customer and an account assigned to that customer and may further identify the contactless card 300 associated with the customer's account.

The processor 330 and memory 3335 elements of the foregoing exemplary embodiments are described with reference to the contact pad 320, but the present disclosure is not limited thereto. It is understood that these elements may be implemented outside of the contact pad 320 or entirely separate from it, or as further elements in addition to the processor 330 and the memory 335 elements located within the contact pad 320.

In some examples, the contactless card 300 may comprise one or more antennas 355. The one or more antennas 355 may be placed within the contactless card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 300 may act as the secondary of an air core transformer. A terminal (such as the user device 120) may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless card 300 may be built on a software platform operable on smart cards or other devices having limited memory, such as JavaCard, and one or more or more applications or applets (applet 340) may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (the user device 120), and produce an NDEF message that comprises a cryptographically secure OTP encoded as an NDEF text tag.

The contactless card 300 may be configured for communication with the user device 120 via a communication interface configured for establishing communication with the user device 120. The communication interface may be configured for contact-based communication, in which case the interface may have electrical circuitry and contact pads on the surface of the card 300 for establishing direct electrical communication between the card 300 and the user device 120. Alternatively or in addition, the communication interface may be configured for contactless communication with the user device 120. In such embodiments, the communication interface may be or include an NFC communication interface configured for communication with other NFC communication devices when the card 300 is within a predetermined NFC range. In some embodiments, the card 300 may include a second communication interface configured for establishing short range communication with the user device 120 via Bluetooth, or other short range communication methodology. In such embodiments, the card 300 may have a short range communication antenna that is included in or connected to the short range communication interface. The card 300 may also include a power management system for use in managing the distribution of power during an NFC transaction.

The contactless card 300 can be configured to transmit a cryptogram to the user device 120 upon tapping to the user device 120. The user device 120 may be configured to read the cryptogram from the contactless card 300 after entry of the contactless card 300 into a communication field of the user device 120. The user device 120 may then transmit the cryptogram to the server 130. The server 130 may be configured to verify the cryptogram by searching the database 140.

FIG. 4 illustrates a flow chart of an example method 400 for authenticating a user using a contactless card as a second authentication factor for multiple factor authentication according to an example embodiment. FIG. 4 may reference the same or similar components as those illustrated in FIGS. 1-3, including a user device, a server, a database, a first device, and a contactless card. The method 400 can be implemented in the system 100 and may include, but is not limited to the following steps.

When a user wants to make an online purchase from a merchant, the user may use the user device 120 to log into his/her online account with the merchant is associated with the first device 110. Alternatively, the user may call using the user device 120 to a customer service center that is associated with the first device 110. In those example embodiments, the user using the user device 120 initiates an engagement with the first device 110. Upon receiving the login credentials or the phone call from the user device 120, the first device 110 may transmit a first authentication request to the server 130 for authenticating the user. Accordingly, at step 405, the server 130 may authenticate the user using a first authentication factor upon receiving the first request from the first device 110. The first authentication factor may the login credential or the phone number associated with the user device 120. For example, the first device 110 may forward the login credential or the phone number to the server 130, and the server 130 may then search for and verify the login credential or the phone number in the database 140.

To further authenticate the user or perform a multiple factor authentication of the user, the first device 110 may request a second authentication factor for authenticating the user and transmit the request to the server 130. For example, the second authentication factor may be a contactless card, such as the contactless card 160/300. Accordingly, at step 410, the server 130 receives the second request from the first device 110 that authenticates the user using the contactless card as the second authentication factor.

At step 415, the server 130 may transmit the second request of using the contactless card 160/300 as the second authentication factor to the user device 120. The second request may be a short message service (SMS) message with a link that would open up a mobile app or mobile app process on the user device 120 from which the contactless card 160/300 can be read in that mobile app.

Upon receiving the second request and by clicking on the link included in the request, the user may use the user device 120 to transmit an NFC prompt and/or query to the contactless card 160/300. In response, after entry of the contactless card 160/300 into the NFC communication field of the user device 120, the contactless card 160/300 transmits to the user device 120 NFC response information (e.g., a cryptogram) usable by the server 130 to authenticate the user. The NFC response information may be or include, for example, security information encrypted by the contactless card 160/300 using a private key unique to the card that is known only to the card account administrator (the server 130). The cryptogram may be stored in the memory of the contactless card 160/300. The cryptogram includes the unique identifier of the contactless card 160/300.

The user device 120 transmits the NFC response information (the cryptogram) the server 130. At step 420, the server 130 receives the cryptogram from the user device 120. The server 130 validates the cryptogram, decrypts the cryptogram and extracts the unique identifier of the contactless card 160/300 through the card authentication module of the server 130 at step 425. When the server receives the cryptogram, the server may decrypt the cryptogram after verifying the cryptogram. The server 130 may then extract the unique identifier of the contactless card 160/300 which is uniquely associated with the user. At step 430, the server 130 may verify the unique identifier of the contactless card 160/300 by searching the database 140. Then at step 435, the server 130 may authenticate the user based on the unique identifier of the contactless card 160/300. That is, the server 130 may authenticate the user using the contactless card 160/300 as the second authentication factor based on the unique identifier of the contactless card 160/300.

In some embodiments, the server 130 may also require the user to enter a personal identification code/number (PIN) as a third authentication factor. Alternatively, the server 130 may require the user to enter a one-time passcode (OTP) as a third authentication factor that is randomly generated and transmitted by the server 130 to the user device 120 in a text message.

At step 440, the server 130 may transmit to the first device 110 the authentication result of using the contactless card 160/300 as the second authentication factor. Also the server 130 may transmit to the user device 120 the authentication result of using the contactless card 160/300 as the second authentication factor. Once the user is authenticated using the contactless card 160/300 as the second authentication factor, the user can continue the initiated transaction with the first device 110 through the user device 120.

In some embodiment, the user device 120 may be a device associated with an entity of the first device 110. For example, when the user visits a bank branch or a merchant store, the user may be required to tap the contactless card to a device installed in that bank branch or the merchant store. That device installed in the bank branch or the merchant store may include an iOS® or Android® device, a point of sale device, a terminal, or a kiosk.

In some embodiments, the user device 120 receives a push notification of using the contactless card as the second authentication factor. The user may tap it and hold his/her finger down for a relatively long duration, which opens up an immediate capability for the user to tap the contactless card quicker. This can remove another step or more friction or time to allow the user to take action more quickly.

In some embodiments, the user may be required to log in the mobile app installed on the user device for reading the contactless card, such as face ID. In some other embodiments, the user may not be required to log in the mobile app installed on the user device for reading the contactless card.

In some embodiments, the transaction or event may occur between the user device 120 and an interactive voice response (IVR) device and/or system. For example, the user may use the user device 120 to call in to the IVR system, punches selections and input initial information that is required to identify who they are by following the prompts. Then the user can trigger, based on the task or the action they want to take on the IVR system, a push notification to go to the user device 120, and that push notification would open up a contactless card tap for the second authentication factor. The systems and methods disclosed herein can use the second authentication factor to allow the user to take or perform a more risky transaction. This can open up an avenue that instead of that call needing to go to a physical agent, the user could keep it within that IVR experience, which can prevent call volume from hitting the agent queues.

In some embodiments, the transaction or event may occur between the user device 120 and a web assistant. For example, the user may be visiting in the browser, or talking to a smart device, which can allow to initiate an action via email to complete the authentication of using the contactless card as the second authentication factor.

Figure 5:
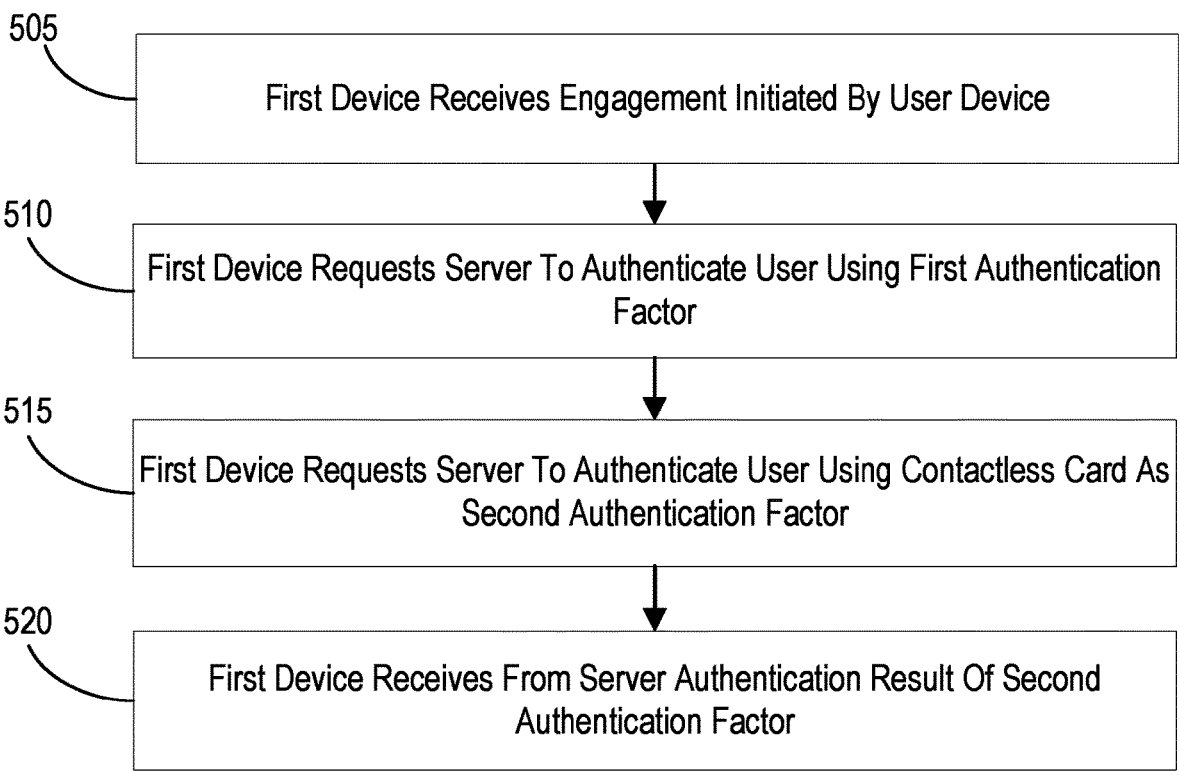
FIG. 5 is a flow chart of a method for authenticating a user using a contactless card as a second authentication factor according to an example embodiment.

FIG. 5 illustrates a flow chart of an example method 500 for authenticating a user using a contactless card as a second authentication factor for multiple factor authentication according to an example embodiment. FIG. 5 may reference the same or similar components as those illustrated in FIGS. 1-4, including a user device, a server, a database, a first device, and a contactless card. The method 500 can be implemented in the system 100 and may include, but is not limited to the following steps.

The method 500 may be implemented on the first device 110. The first device 110 is associated with an entity with whom the user initiates a transaction, such as a call center, a bank branch, a local merchant store, and the like. In step 505, the first device 110 receives an engagement initiated from the user device 120 associated with a user. For example, the first device 110 receives a phone call made by the user from the user device 120. In step 510, the first device 110 requests the server 130 to authenticate the user using a first authentication factor. The first authentication factor may be a phone number of the user device 120. The first device 110 can transmit the phone number of the user device 120 to the server 130, and the server 130 can verify the phone number by searching the database 140 for a matching phone number associated with the user. In step 515, the first device 110 requests the server 130 to authenticate the user using a contactless card as a second authentication factor. For example, once the user is authenticated with the first authentication factor, the first device 110 may require a second authentication factor for further verifying the user, and accordingly, transmits a second authentication request to the server 130 for authenticating the user using a contactless card as the second authentication factor. In step 520, the first device 110 receives from the server 130 the authentication result of the second authentication factor. For example, when the server 130 verifies the user using the contactless card 160/300 as the second authentication factor, the server 130 can transmit to the first device 110 the authentication result of the second authentication factor.

FIG. 6 illustrates a flow chart of an example method 600 for authenticating a user using a contactless card as a second authentication factor for multiple factor authentication according to an example embodiment. FIG. 6 may reference the same or similar components as those illustrated in FIGS. 1-5, including a user device, a server, a database, a first device, and a contactless card. The method 600 can be implemented in the system 100 and may include, but is not limited to the following steps.

The method 600 can be implemented on the user device 120. In step 605, the user device 120 associated with the user initiates an engagement communication with the first device 110. For example, the user from the user device 120 makes a phone call to the first device 110. In step 610, the user device receives from the server 130 a first authenticate result of the user using a first authentication factor. The first authentication factor may be a phone number of the user device 120. The first device 110 can transmit the phone number of the user device 120 to the server 130, and the server 130 can verify the phone number by searching the database 140 for a matching phone number associated with the user. The server 130 can then transmit to the user device the first authenticate result of the user using the first authentication factor. In step 615, the user device 120 receives from the server 130 a request to tap the contactless card as a second authentication factor. For example, the first device 110 requests the server 130 to further authenticate the user using a contactless card as a second authentication factor. The server 130 transmits the second authentication request to the user device 120 for authenticating the user using the contactless card as the second authentication factor. In step 620, the user device 120 transmits a NFC query to the contactless card. After entry of the contactless card into the NFC communication field of the user device 120, the contactless card transmits to the user device 120 NFC response information (e.g., a cryptogram) usable by the server 130 to authenticate the user. Accordingly, in step 625, the user device 120 receives the cryptogram from the contactless card, and then transmits the cryptogram to the server 130 in step 630. When the server 130 verifies the user using the contactless card 160/300 based on the cryptogram as the second authentication factor, the server 130 can transmit to the user device 120 the authentication result of the second authentication factor. Accordingly, in step 635, the user device receives from the server 130 the second authentication result of using the contactless card as the second authentication factor.

In some aspects, the techniques described herein relate to a method for authenticating a user using a contactless card, including: receiving, by a server from a first device, a first request to authenticate the user using a first authentication factor; authenticating, by the server, the user using the first authentication factor; transmitting, by the server to the first device, a first authentication result indicating authentication of the user using the first authentication factor; receiving, by the server from the first device, a second request to authenticate the user using the contactless card; transmitting, by the server to a user device associated with the user, the second request in a message format; receiving, by the server from the user device, a cryptogram; decrypting, by the server, the cryptogram; extracting, by the server, from the decrypted cryptogram a unique customer identifier associated with the contactless card; verifying, by the server, the unique customer identifier; authenticating, by the server, the user using the unique customer identifier; and transmitting, by the server to the first device, a second authentication result indicating authentication of the user using the contactless card.

In some aspects, the techniques described herein relate to a method, wherein the first authentication factor includes at least one selected from the group of a name of the user, a phone number of the user, a home address of the user, a login credential, a biometric identification of the user, and a photo identification of the user.

In some aspects, the techniques described herein relate to a method, wherein the first device includes at least one selected from the group of a customer call center device, an interactive voice response device, an online website hosting device, and an automated teller machine (ATM), a computer in a financial branch, and a kiosk machine.

In some aspects, the techniques described herein relate to a method, wherein the message format includes at least one selected from the group of a short message service (SMS) message with a deeplink, a mobile application notification, a push notification, and an email.

In some aspects, the techniques described herein relate to a method, wherein the user device includes at least one selected from the group of a mobile device having a mobile application installed thereon configured for reading the contactless card, a computer tablet configured for reading the contactless card, an ATM configured for reading the contactless card, a computer in a financial branch configured for reading the contactless card, and a kiosk machine configured for reading the contactless card.

In some aspects, the techniques described herein relate to a method, wherein the contactless card includes a processor and a memory, the memory storing the cryptogram that contains the unique customer identifier.

In some aspects, the techniques described herein relate to a method, wherein: the memory of the contactless card further contains a counter value and a key, and the processor of the contactless card is configured to generate the cryptogram using the counter value, the key, and the unique customer identifier.

In some aspects, the techniques described herein relate to a method, wherein the processor of the contactless card is configured to update the counter value.

In some aspects, the techniques described herein relate to a system for authenticating a user using a contactless card, including a server, the server configured to: receive, from a first device, a first request to authenticate the user using a first authentication factor; authenticate the user using the first authentication factor; transmit, to the first device, a first authentication result indicating authentication of the user using the first authentication factor; receive, from the first device, a second request to authenticate the user using the contactless card; transmit, to a user device associated with the user, the second request in a message format; receive, from the user device, a cryptogram; decrypt the cryptogram; extract from the decrypted cryptogram a unique customer identifier associated with the contactless card; verify the unique customer identifier; authenticate the user using the unique customer identifier; and transmit, to the first device, a second authentication result indicating authentication of the user using the contactless card.

In some aspects, the techniques described herein relate to a system, wherein the first authentication factor includes at least one selected from the group of a name of the user, a phone number of the user, a home address of the user, a login credential, a biometric identification of the user, and a photo identification of the user.

In some aspects, the techniques described herein relate to a system, wherein the first device includes at least one selected from the group of a customer call center device, an interactive voice response device, an online website hosting device, and an automated teller machine (ATM), a computer in a financial branch, and a kiosk machine.

In some aspects, the techniques described herein relate to a system, wherein the message format includes at least one selected from the group of a short message service (SMS) message with a deeplink, a mobile application notification, a push notification, and an email.

In some aspects, the techniques described herein relate to a system, wherein the user device includes at least one selected from the group of a mobile device having a mobile application installed thereon configured for reading the contactless card, a computer tablet configured for reading the contactless card, an ATM configured for reading the contactless card, a computer in a financial branch configured for reading the contactless card, and a kiosk machine configured for reading the contactless card.

In some aspects, the techniques described herein relate to a system, wherein the contactless card includes a processor and a memory, the memory storing the cryptogram that contains the unique customer identifier.

In some aspects, the techniques described herein relate to a system, wherein: the memory of the contactless card further contains a counter value and a key, and the processor of the contactless card is configured to generate the cryptogram using the counter value, the key, and the unique customer identifier.

In some aspects, the techniques described herein relate to a system, wherein the processor of the contactless card is configured to update the counter value.

In some aspects, the techniques described herein relate to a non-transitory, computer-readable medium including instructions for authenticating a user using a contactless card that, when executed on a computer arrangement, perform actions including: receiving, from a first device, a first request to authenticate the user using a first authentication factor; authenticating the user using the first authentication factor; transmitting, to the first device, a first authentication result indicating authentication of the user using the first authentication factor; receiving, from the first device, a second request to authenticate the user using the contactless card; transmitting, to a user device associated with the user, the second request in a message format; receiving, from the user device, a cryptogram; decrypting the cryptogram; extracting from the decrypted cryptogram a unique customer identifier associated with the contactless card; verifying the unique customer identifier; authenticating the user using the unique customer identifier; and transmitting, to the first device, a second authentication result indicating authentication of the user using the contactless card.

In some aspects, the techniques described herein relate to a non-transitory, computer-readable medium, wherein the first authentication factor includes at least one selected from the group of a name of the user, a phone number of the user, a home address of the user, a login credential, a biometric identification of the user, and a photo identification of the user.

In some aspects, the techniques described herein relate to a non-transitory, computer-readable medium, wherein the message format includes at least one selected from the group of a short message service (SMS) message with a deeplink, a mobile application notification, a push notification, and an email.

In some aspects, the techniques described herein relate to a non-transitory, computer-readable medium, wherein the contactless card includes a processor and a memory, the memory storing the cryptogram that contains the unique customer identifier.

Throughout the disclosure, the term merchant is used, and it is understood that the present disclosure is not limited to a particular merchant or type of merchant. Rather, the present disclosure includes any type of merchant, vendor, or other entity involving in activities where products or services are sold or otherwise provided.

As used herein, the term "account" is not limited to a particular type of account. Rather, it is understood that the term "account" can refer to a variety of accounts, including without limitation, a financial account (e.g., a credit account, a debit account), a membership account, a loyalty account, a subscription account, a services account, a utilities account, a transportation account, and a physical access account. It is further understood that the present disclosure is not limited to accounts issued by a particular entity.

In some examples, exemplary procedures in accordance with the present disclosure described herein can be performed by a processing arrangement and/or a computing arrangement (e.g., a computer hardware arrangement). Such processing and/or computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of a first device, a user device, a server, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, and any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing and/or processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing and/or processing device receives computer readable program instructions from the network and forwards the computer readable program instructions for storage in a computer readable storage medium within the respective computing and/or processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Throughout the disclosure, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for authenticating a user using a contactless card, comprising:

receiving, by a server from a first device, a first request to authenticate the user using a first authentication factor;

authenticating, by the server, the user using the first authentication factor;

transmitting, by the server to the first device, a first authentication result indicating authentication of the user using the first authentication factor;

receiving, by the server from the first device, a second request to authenticate the user using the contactless card;

transmitting, by the server to a user device associated with the user, the second request in a message format;

receiving, by the server from the user device, encrypted data;

transmitting, by the server to a card authentication module, the encrypted data;

receiving, by the card authentication module from the server, the encrypted data;

decrypting, by the card authentication module, the encrypted data;

extracting, by the card authentication module, from the decrypted data a unique customer identifier associated with the contactless card;

outputting, by the card authentication module to the server, the unique customer identifier;

receiving, by the server from the card authentication module, the unique customer identifier;

verifying, by the server, the unique customer identifier;

authenticating, by the server, the user using the unique customer identifier; and transmitting, by the server to the first device, a second authentication result indicating authentication of the user using the contactless card.

2. The method according to claim 1, wherein the first authentication factor comprises at least one selected from a group consisting of a name of the user, a phone number of the user, a home address of the user, a login credential, a biometric identification of the user, and a photo identification of the user.

3. The method according to claim 1, wherein the first device comprises at least one selected from a group consisting of a customer call center device, an interactive voice response device, an online website hosting device, and an automated teller machine (ATM), a computer in a financial branch, and a kiosk machine.

4. The method according to claim 1, wherein the message format comprises at least one selected from a group consisting of a short message service (SMS) message with a deeplink, a mobile application notification, a push notification, and an email.

5. The method according to claim 1, wherein the user device comprises at least one selected from a group consisting of a mobile device having a mobile application installed thereon configured for reading the contactless card, a computer tablet configured for reading the contactless card, an ATM configured for reading the contactless card, a computer in a financial branch configured for reading the contactless card, and a kiosk machine configured for reading the contactless card.

6. The method according to claim 1, wherein the contactless card comprises a processor and a memory, the memory storing the encrypted data cryptogram that contains the unique customer identifier.

7. The method according to claim 6, wherein:

the memory of the contactless card further contains a counter value and a key, and the processor of the contactless card is configured to generate the encrypted data using the counter value, the key, and the unique customer identifier.

8. The method according to claim 7, wherein the processor of the contactless card is configured to update the counter value.

9. A system for authenticating a user using a contactless card, comprising a server and a card authentication module, the server configured to:

receive, from a first device, a first request to authenticate the user using a first authentication factor;

authenticate the user using the first authentication factor;

transmit, to the first device, a first authentication result indicating authentication of the user using the first authentication factor;

receive, from the first device, a second request to authenticate the user using the contactless card;

transmit, to a user device associated with the user, the second request in a message format;

receive, from the user device, encrypted data; and transmit, to the card authentication module, the encrypted data;

the card authentication module configured to:

receive, from the server, the encrypted data;

decrypt the encrypted data;

extract from the decrypted data cryptogram a unique customer identifier associated with the contactless card; and output, to the server, the unique customer identifier;

the server further configured to:

receive, from the card authentication module, the unique customer identifier;

verify the unique customer identifier;

authenticate the user using the unique customer identifier; and transmit, to the first device, a second authentication result indicating authentication of the user using the contactless card.

10. The system according to claim 9, wherein the first authentication factor comprises at least one selected from a group consisting of a name of the user, a phone number of the user, a home address of the user, a login credential, a biometric identification of the user, and a photo identification of the user.

11. The system according to claim 9, wherein the first device comprises at least one selected from a group consisting of a customer call center device, an interactive voice response device, an online website hosting device, and an automated teller machine (ATM), a computer in a financial branch, and a kiosk machine.

12. The system according to claim 9, wherein the message format comprises at least one selected from a group consisting of a short message service (SMS) message with a deeplink, a mobile application notification, a push notification, and an email.

13. The system according to claim 9, wherein the user device comprises at least one selected from a group consisting of a mobile device having a mobile application installed thereon configured for reading the contactless card, a computer tablet configured for reading the contactless card, an ATM configured for reading the contactless card, a computer in a financial branch configured for reading the contactless card, and a kiosk machine configured for reading the contactless card.

14. The system according to claim 9, wherein the contactless card comprises a processor and a memory, the memory storing the encrypted data that contains the unique customer identifier.

15. The system according to claim 14, wherein: the memory of the contactless card further contains a counter value and a key, and the processor of the contactless card is configured to generate the encrypted data using the counter value, the key, and the unique customer identifier.

16. The system according to claim 15, wherein the processor of the contactless card is configured to update the counter value.

17. A non-transitory, computer-readable medium comprising instructions for authenticating a user using a contactless card that, when executed on a computer arrangement, perform actions comprising:

receiving, from a first device, a first request to authenticate the user using a first authentication factor;

authenticating the user using the first authentication factor;

transmitting, to the first device, a first authentication result indicating authentication of the user using the first authentication factor;

receiving, from the first device, a second request to authenticate the user using the contactless card;

transmitting, to a user device associated with the user, the second request in a message format;

receiving, from the user device, encrypted data;

transmitting, to a card authentication module, the encrypted data;

receiving, by the card authentication module, the encrypted data;

decrypting, by the card authentication module, the encrypted data;

extracting, by the card authentication module, from the decrypted data a unique customer identifier associated with the contactless card;

outputting, by the card authentication module, the unique customer identifier;

receiving, from the card authentication module, the unique customer identifier;

verifying the unique customer identifier;

authenticating the user using the unique customer identifier; and transmitting, to the first device, a second authentication result indicating authentication of the user using the contactless card.

18. The non-transitory, computer-readable medium according to claim 17, wherein the first authentication factor comprises at least one selected from a group consisting of a name of the user, a phone number of the user, a home address of the user, a login credential, a biometric identification of the user, and a photo identification of the user.

19. The non-transitory, computer-readable medium according to claim 17, wherein the message format comprises at least one selected from a group consisting of a short message service (SMS) message with a deeplink, a mobile application notification, a push notification, and an email.

20. The non-transitory, computer-readable medium according to claim 17, wherein the contactless card comprises a processor and a memory, the memory storing the encrypted data that contains the unique customer identifier.

* * * * *